C. O. WOLFERTS.
Seed-Package.
No. 220,896.   Patented Oct. 21, 1879.
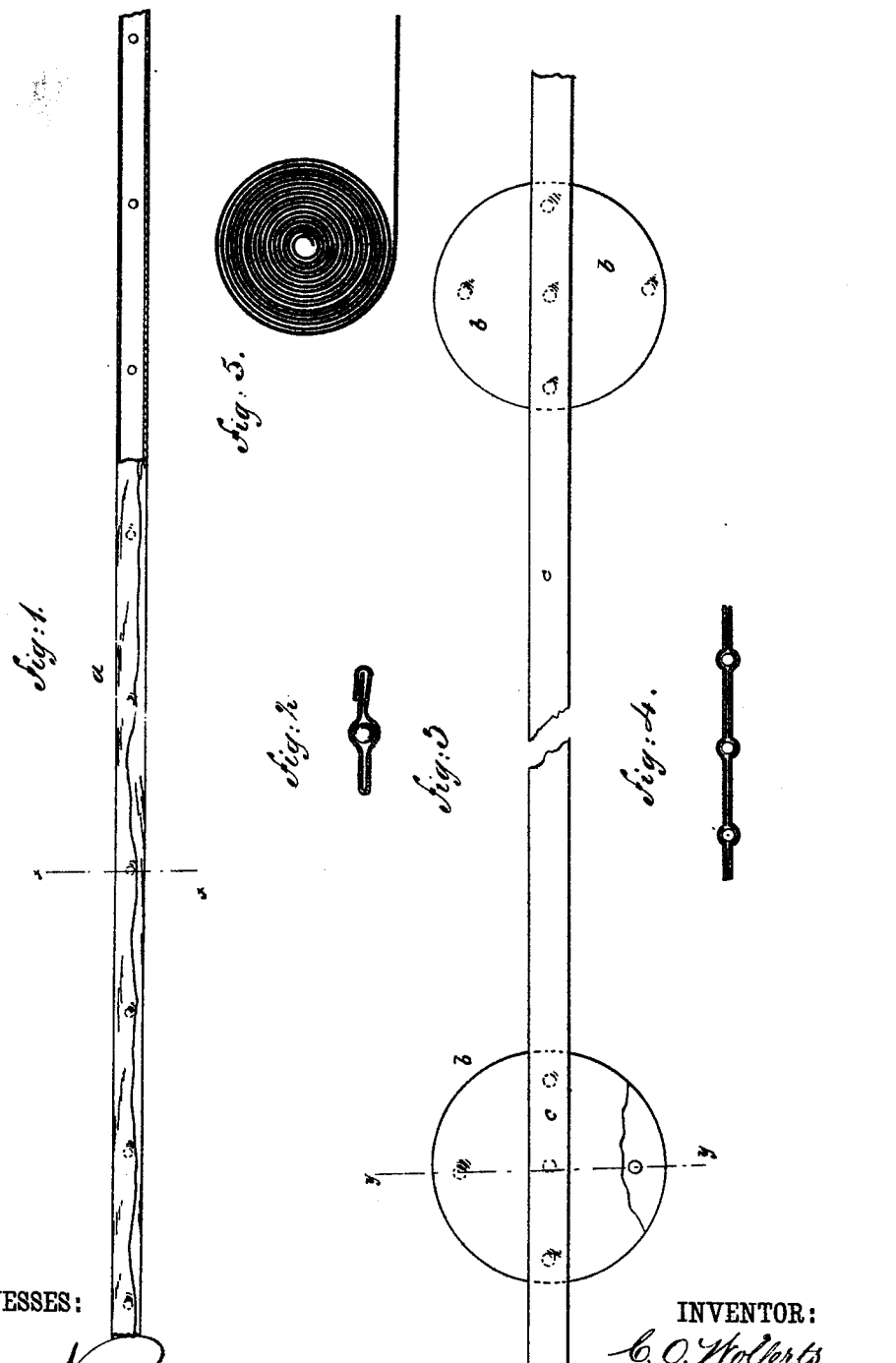

UNITED STATES PATENT OFFICE.

CARL O. WOLFERTS, OF HICKSVILLE, N. Y., ASSIGNOR OF ONE-HALF OF HIS RIGHT TO CAESAR R. BANNIHR, OF WEST CHESHIRE, CONN.

IMPROVEMENT IN SEED-PACKAGES.

Specification forming part of Letters Patent No. 220,896, dated October 21, 1879; application filed August 8, 1879.

*To all whom it may concern:*

Be it known that I, CARL O. WOLFERTS, of Hicksville, in the county of Queens and State of New York, have invented a new and Improved Seed-Package, of which the following is a specification.

The objects of this invention are economy in the use of seed, convenience to the buyer and seller in handling seed, and facility and regularity in planting.

The invention is applicable to flower and vegetable seeds, grain, &c.; and it consists in placing the seed within a wrapping of paper, or other suitable material, in the quantity and distance apart required in planting, so that the seeds are protected and in a shape adapted for sale, and in planting it will be only necessary to place the package in the ground.

With seeds that are to be planted in rows, the packages are made in continuous narrow strips, preferably folded lengthwise, with the seed fixed between the folds, so that for keeping they can be rolled up in compact form. With seeds usually planted in hills, they are fixed between disks of paper in the proper number and distance for forming a hill, and the separate packages may be connected by a band or ribbon to secure uniformity in the hills. By these means the seeds can be planted uniformly as to depth and distance apart and in straight lines, and the waste and irregularity resulting from ignorance and carelessness are obviated.

The accompany drawings illustrate my invention.

Figure 1 represents a portion of a seed-package in a form adapted for planting in rows. Fig. 2 is a cross-section of the same in larger size. Fig. 3 shows the seed-packages for hill-planting. Fig. 4 is a cross-section of the same. Fig. 5 represents a package as rolled up.

Similar letters of reference indicate corresponding parts.

The continuous strip *a* is to be folded by hand or a suitable machine, and the seed inserted between the folds at proper intervals during the folding operation. The edges and folds of the paper are to be secured by adhesive material, to prevent the seeds from becoming misplaced. This package is adapted for rolling up in compact form, as shown by Fig. 5, and for cutting off in lengths as required.

All flower-seeds, many vegetable-seeds, peas, beans, &c., can be put up and planted in this form.

The hill-packages *b* are made of two disks of paper, or other material, pasted together, with the seeds placed between them, and arranged as desired for the hill. These packages may be connected by a strip or ribbon, *c*, to secure uniformity in the distance apart of the hills.

Any suitable material which will become rotten or ruptured by the moisture of the ground and growth of the shoot can be used for the package. I prefer thin paper; but thick paper can be used, as the moisture will cause germination before the paper is ruptured, and there will be no delay.

The continuous strip, instead of being a single piece folded, may be two narrow strips pasted together, with the seeds between.

Having thus fully described my invention, I claim as new and desire to secure by Letters Patent—

1. The improved method of preparing seeds for sale and planting, which consists in inclosing the seeds within a wrapping in quantity and position as required for planting, substantially as shown and described.

2. The improved seed-package, consisting of the folded or double strip or disk of paper, or other suitable material, with the seeds inclosed and fixed, substantially as described and shown, and for the purposes set forth.

3. In combination with seed-packages, the strip or ribbon *c*, substantially as and for the purposes specified.

CARL OTTO WOLFERTS.

Witnesses:
GEO. D. WALKER,
JOHN BANNIHR.